(12) United States Patent
Harb

(10) Patent No.: US 8,918,333 B2
(45) Date of Patent: Dec. 23, 2014

(54) METHOD, SYSTEM AND APPARATUS FOR INTERACTIVE RADIO ADVERTISING

(76) Inventor: Joseph Harb, Woodinville, WA (US)

( * ) Notice: Subject to any disclaimer, the term of this patent is extended or adjusted under 35 U.S.C. 154(b) by 200 days.

(21) Appl. No.: 13/544,932

(22) Filed: Jul. 9, 2012

(65) Prior Publication Data

US 2013/0179275 A1 Jul. 11, 2013

Related U.S. Application Data

(63) Continuation-in-part of application No. 12/391,221, filed on Feb. 23, 2009, now Pat. No. 8,462,645.

(60) Provisional application No. 61/505,515, filed on Jul. 7, 2011.

(51) Int. Cl.
*G06Q 30/00* (2012.01)
*G06F 3/00* (2006.01)
*G06Q 30/02* (2012.01)

(52) U.S. Cl.
CPC ........ *G06Q 30/0277* (2013.01); *G06Q 30/0241* (2013.01)
USPC .......................................... 705/14.73; 725/42

(58) Field of Classification Search
USPC ................. 370/310–350, 389, 392, 464–465; 705/14.73
See application file for complete search history.

(56) References Cited

U.S. PATENT DOCUMENTS

| | | | |
|---|---|---|---|
| 5,898,910 A | 4/1999 | Miyake | |
| 6,252,364 B1 | 6/2001 | Chiang | |
| 6,481,628 B2 | 11/2002 | Liou | |
| 6,623,136 B1 | 9/2003 | Kuo | |
| 6,650,534 B2 | 11/2003 | Tree | |
| 6,799,201 B1 * | 9/2004 | Lee et al. | 709/217 |
| 6,845,360 B2 | 1/2005 | Jensen | |
| 6,895,694 B2 * | 5/2005 | Nye | 36/8.3 |
| 6,915,176 B2 | 7/2005 | Novelli | |
| 7,062,528 B2 | 6/2006 | Deguchi | |
| 7,107,234 B2 | 9/2006 | Deguchi | |
| 7,127,454 B2 | 10/2006 | Deguchi | |
| 7,158,943 B2 | 1/2007 | Van der Riet | |
| 7,190,971 B1 | 3/2007 | Kawamoto | |
| 7,302,243 B2 | 11/2007 | Tarbouriech | |
| 7,555,539 B1 * | 6/2009 | Rosenberg et al. | 709/219 |
| 7,840,691 B1 * | 11/2010 | De Bonet et al. | 709/231 |

(Continued)

FOREIGN PATENT DOCUMENTS

WO    WO 2007/092463 A3    8/2007

OTHER PUBLICATIONS

Olsen, Stefanie, Will consumers warm up to CATs?, CNET News. Http://news.cnet.com/Will-consumers-warm-up-to-CATs/2100-1017_3-244055.html. Aug. 3, 2000; 6 pages.

(Continued)

*Primary Examiner* — Warner Wong
(74) *Attorney, Agent, or Firm* — Stolowitz Ford Cowger LLP

(57) ABSTRACT

Method and device for: receiving a playlist identifying a media item comprising a song or an advertisement, or a combination thereof, storing the playlist in a database, associating the identified media item with a first supplemental data and a second supplemental playlist data, sending the first supplemental data to a radio station server to be broadcast substantially simultaneously with the associated media item, and displaying the second supplemental data on a website, wherein the display is configured for accessing by a computer and mobile device.

24 Claims, 13 Drawing Sheets

(56) References Cited

U.S. PATENT DOCUMENTS

| | | | |
|---|---|---|---|
| 7,853,622 B1* | 12/2010 | Baluja et al. | 707/803 |
| 7,908,172 B2 | 3/2011 | Corts | |
| 8,045,952 B2* | 10/2011 | Qureshey et al. | 455/344 |
| 8,296,195 B2 | 10/2012 | Harb | |
| 8,310,985 B2 | 11/2012 | Harb | |
| 8,391,155 B2 | 3/2013 | Harb | |
| 8,462,645 B1 | 6/2013 | Harb | |
| 8,664,161 B2* | 3/2014 | Tandler | 504/114 |
| 8,719,349 B2* | 5/2014 | Lockhart et al. | 709/206 |
| 2001/0055391 A1 | 12/2001 | Jacobs | |
| 2002/0049037 A1 | 4/2002 | Christensen | |
| 2002/0082901 A1 | 6/2002 | Dunning | |
| 2002/0116082 A1* | 8/2002 | Gudorf | 700/94 |
| 2003/0097338 A1 | 5/2003 | Mankovich | |
| 2004/0034560 A1 | 2/2004 | Mathis | |
| 2004/0210943 A1 | 10/2004 | Philyaw | |
| 2004/0214525 A1 | 10/2004 | Ahn | |
| 2005/0060350 A1 | 3/2005 | Baum | |
| 2005/0154599 A1 | 7/2005 | Kopra | |
| 2005/0181722 A1* | 8/2005 | Kopra et al. | 455/2.01 |
| 2005/0216855 A1 | 9/2005 | Kopra | |
| 2006/0074808 A1 | 4/2006 | Boesen | |
| 2006/0141962 A1 | 6/2006 | Forbes | |
| 2006/0143016 A1 | 6/2006 | Jones | |
| 2006/0253874 A1 | 11/2006 | Stark | |
| 2006/0265731 A1 | 11/2006 | Matsuda | |
| 2007/0043829 A1 | 2/2007 | Dua | |
| 2007/0061215 A1 | 3/2007 | Waites | |
| 2007/0100766 A1 | 5/2007 | Healy | |
| 2007/0142055 A1 | 6/2007 | Toivanen | |
| 2007/0143778 A1 | 6/2007 | Covell | |
| 2007/0149114 A1 | 6/2007 | Danilenko | |
| 2007/0232223 A1 | 10/2007 | Bilange | |
| 2007/0239895 A1 | 10/2007 | Alperin | |
| 2007/0244750 A1 | 10/2007 | Grannan | |
| 2007/0265979 A1* | 11/2007 | Hangartner | 705/59 |
| 2007/0281606 A1 | 12/2007 | Baunach | |
| 2007/0294096 A1 | 12/2007 | Randall | |
| 2008/0114480 A1 | 5/2008 | Harb | |
| 2008/0114664 A1 | 5/2008 | Harb | |
| 2008/0147487 A1 | 6/2008 | Hirshberg | |
| 2008/0214236 A1 | 9/2008 | Harb | |
| 2008/0249886 A1 | 10/2008 | Woodard | |
| 2008/0318529 A1 | 12/2008 | Harb | |
| 2009/0125609 A1* | 5/2009 | Wood et al. | 709/219 |
| 2010/0161420 A1 | 6/2010 | Mandel | |
| 2014/0046775 A1 | 2/2014 | Harb | |

OTHER PUBLICATIONS

PR Newswire: "Alchemdeia and Digimarc Form Strategic Partnership to Manage Online Content," Oct. 23, 2000, Proquest #62834302, 4 pages.

Digimarc Corporation Website: Internet Archive Wayback Machine, www.archive.org, May 2001, 3 pages.

Vranica, Suzanne "NBC's Olympic Test: Counting all the Games' Viewers," Wall Street Journal, Jul. 7, 2008; 1 page.

Beaumont, Claudine, Google G1 Phone Will Teach Users How to Play the Guitar and Make the Perfect Martini Telegraph.co.uk, Date: Oct. 24, 2008; 3 pages.

International Searching Authority USPTO; International Search Report for matter PCT/US08/82509; Jan. 8, 2009; 3 pages.

Stolowitz Ford Cowger LLP List of Related Matters dated Dec. 23, 2011.

* cited by examiner

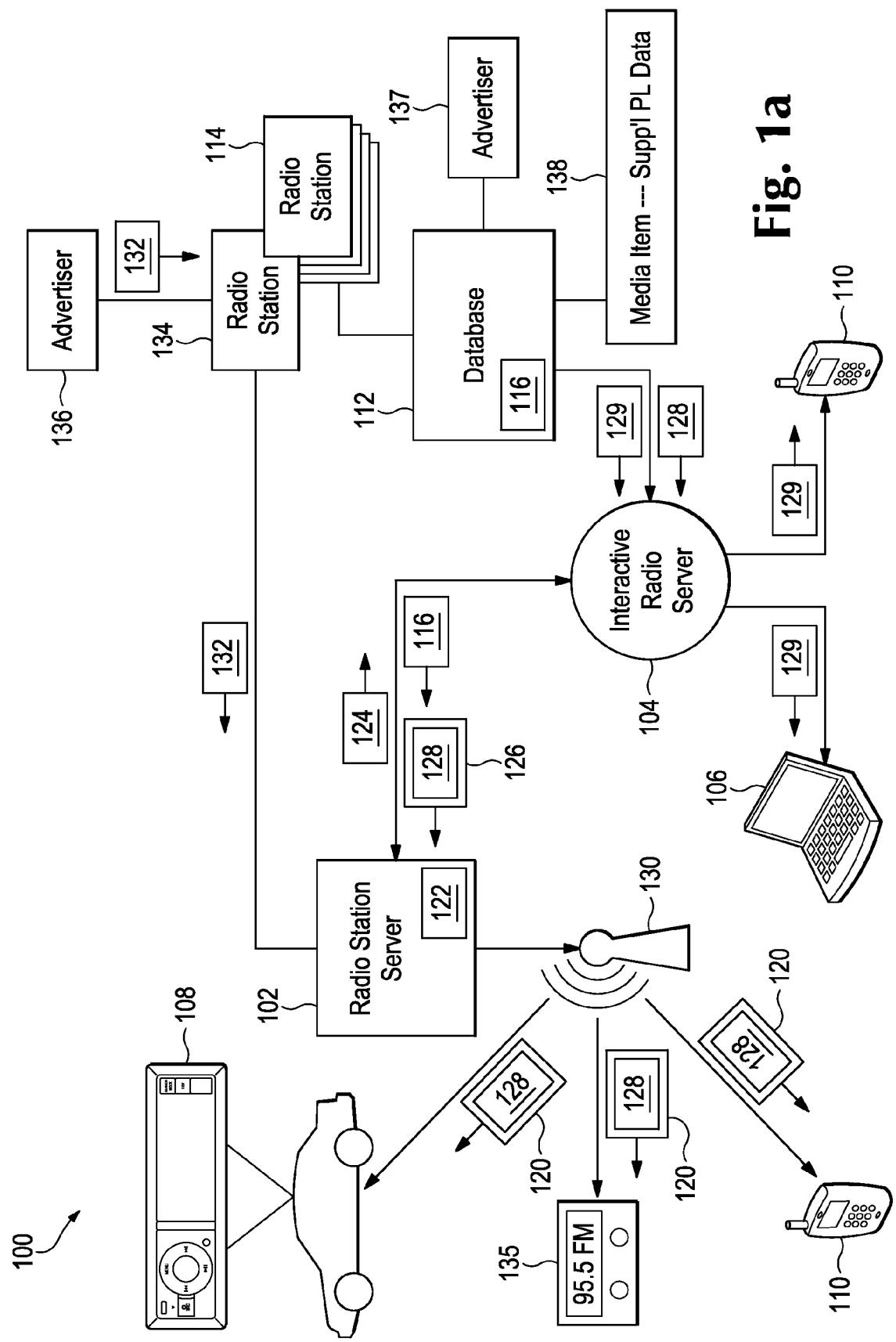

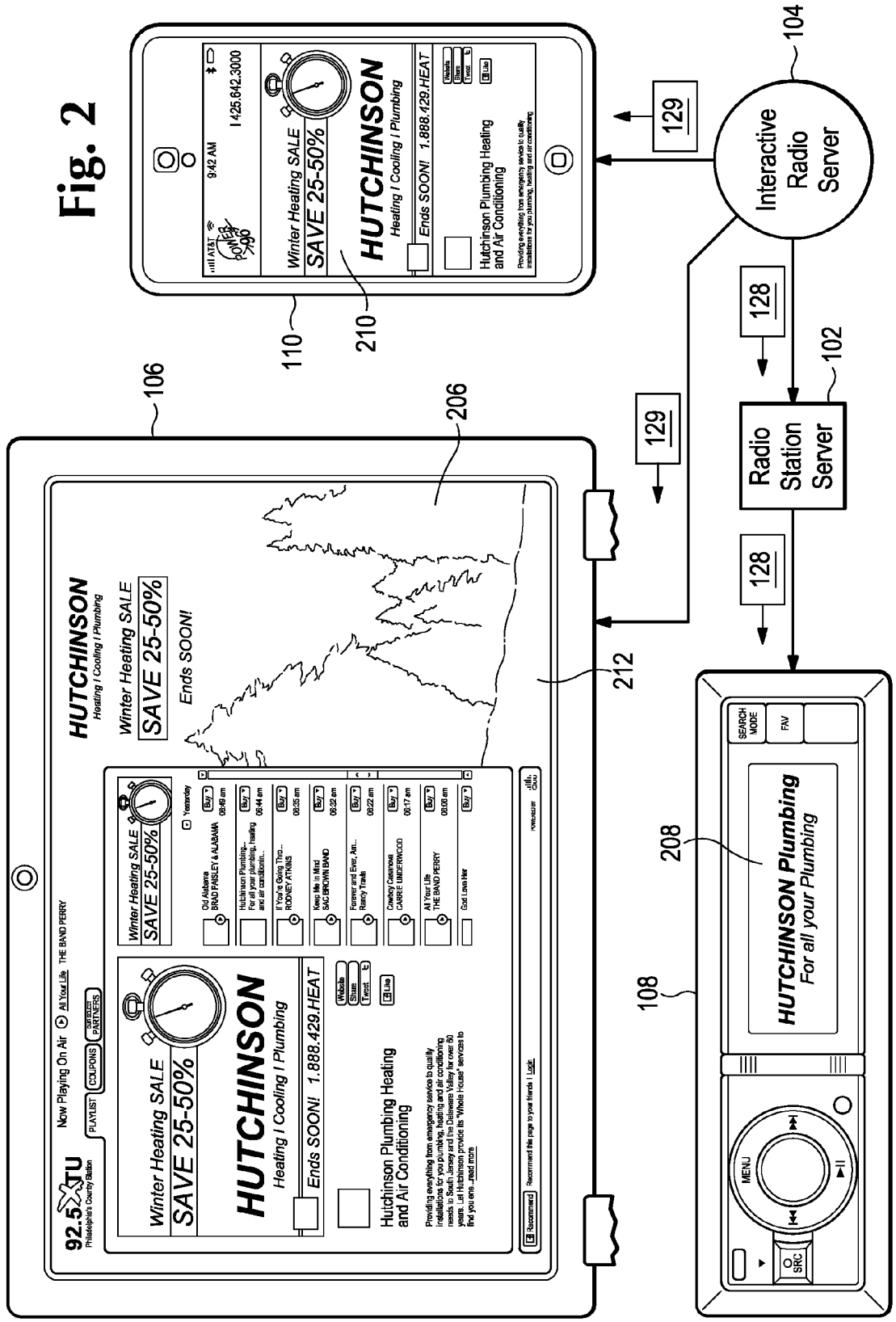

| Campaigns | | | | | | | |
|---|---|---|---|---|---|---|---|
| ⊕ ADD \| ⊘ ACTIVATE \| DEACTIVATE \| ⊗ DELETE \| ▭ DUPLICATE \| 🔍 SEARCH \| SHOW/HIDE EXPIRED | | | | | | | |
| Name | Start Date | End Date | Type | Clickable | Alert Email | Remarks | |
| Fayetteville State University | 2012-02-10 | 2012-02-29 | Item Skin | WS | jen.pudsey@bbgi... | WZFX & WUKS | |
| Fayetteville State University | 2012-02-10 | 2012-02-29 | RDS | No | jen.pudsey@bbgi... | WZFX & WUKS | |

Quu Buzz

Welcome | My Account | Logout

Campaigns  Show by keyword  Show in 1 list  Rating  Voting  Blocked numbers

Campaign: The Plan    Start date: 2011-01-03    End date: 2011-01-27    [Go]

Reply    Blocked Number    Scheduled Reply

⊕ Reply  ⊗ Delete  ⊘ Block

| | Phone | Text | Date | Time |
|---|---|---|---|---|
| ☐ | 5 | And JETS GO ALL THE WAY!!! | 2001-01-20 | 20:18:36 |
| ☐ | 5 | if you guys could play some Linkin Park that would be awesome. | 2001-01-20 | 20:17:13 |
| ☐ | 6 | can you say this live? "Heather Scott, will you marry me? - Ryan" | 2001-01-20 | 20:15:11 |
| ☐ | 6 | can you say this live? "Heather Scott, will you marry me? - Ryan" | 2001-01-20 | 20:02:28 |
| ☐ | 6 | if pink floyd and Ronny James Dio jammed (assuming they all were alive) would they make a good song? | 2001-01-20 | 19:55:28 |
| ☐ | | thank you for answering my scorpions question D | 2001-01-20 | 19:51:21 |
| ☐ | | answer this question live please, what do you think of the scorpions retiring after 40 years? | 2001-01-20 | 19:43:54 |
| ☐ | | O yea with their "great" coaches | 2001-01-20 | 19:43:36 |
| ☐ | | What do you think of Steven Tyler on American Idol? | 2001-01-20 | 19:40:17 |
| ☐ | | carolina panthers vs. Buffalo bills | 2001-01-20 | 19:36:39 |
| ☐ | | play "troubled child" by journey. Its on the frontiers album. Write back, ryan | 2001-01-20 | 19:33:19 |
| ☐ | | can I get some info about the get together in brick for officer matiosz | 2001-01-20 | 19:14:20 |
| ☐ | | ......Bears over Steelers 16 - 7 Ray from Manahawkin | 2001-01-20 | 19:11:53 |
| ☐ | 7 | jets da bears | 2001-01-20 | 19:11:19 |
| ☐ | 7 | beards = villains | 2001-01-20 | 19:10:59 |
| ☐ | 6 | steelers, but im rooting for the mets(hehe) | 2001-01-20 | 19:10:43 |
| ☐ | 7 | redskings | 2001-01-20 | 19:08:13 |
| ☐ | 6 | Pittsburgh Steelers And Green Bay Packers | 2001-01-20 | 19:07:38 |
| ☐ | 7 | the jets of course i help them win du4 love your 7how 2nt ever get zou7 m ptime | 2001-01-20 | 19:07:11 |
| ☐ | 7 | packers-steelers. Mike likes charlies pizza | 2001-01-20 | 19:07:03 |
| ☐ | 8 | oh good, we can have some fun! | 2001-01-20 | 18:48:01 |
| ☐ | 8 | whatssup? | 2001-01-20 | 18:46:59 |

Page [1] of 3 ▶ ▶|    Displaying 1 - 50 of 116

800

METHOD, SYSTEM AND APPARATUS FOR INTERACTIVE RADIO ADVERTISING

RELATED PATENTS

This application claims priority to U.S. Provisional Patent Application No. 61/505,515, entitled "INTERACTION WITH MEANINGFUL CONTACT ON THE RADIO," filed Jul. 7, 2011 and is a continuation-in-part of U.S. patent application Ser. No. 12/391,221, entitled "INTERACTIVE ADVERTISING SYSTEM, BUSINESS METHODS AND SOFTWARE," filed Feb. 23, 2009, both of which are incorporated herein by this reference in their entireties.

TECHNICAL FIELD

Methods and devices for interactive radio advertising.

BACKGROUND

Traditional radio lacks a visual/tactile component. As the consuming public increases dependence on immediate access to content, products and services via personal electronic devices such as smart phones, laptops, notepads and etc., it is becoming increasingly difficult for radio stations to engage listeners and to incentivize them to take action based on information that is being broadcast whether the information being broadcast is advertising, polling, and/or other types of programming. Since its inception, the radio has evolved in terms of technology and quality of sound, but not in terms of becoming interactive. Currently, a listener may not interact with broadcast radio on multiple platforms to obtain information, share information, and take other actions in response to items heard on the radio, in a timely and convenient manner.

BRIEF DESCRIPTION OF THE DRAWINGS

FIG. 1a depicts a system for interactive radio advertising.

FIG. 2 depicts an example of an integrated and interactive radio advertising campaign.

FIG. 7 depicts an example of an interactive radio programming user interface 700 for a backend customer service and upload (BCSU) application.

FIG. 8 depicts an interactive radio programming user interface.

DESCRIPTION OF EXAMPLE EMBODIMENTS

Overview

Figure 1B:
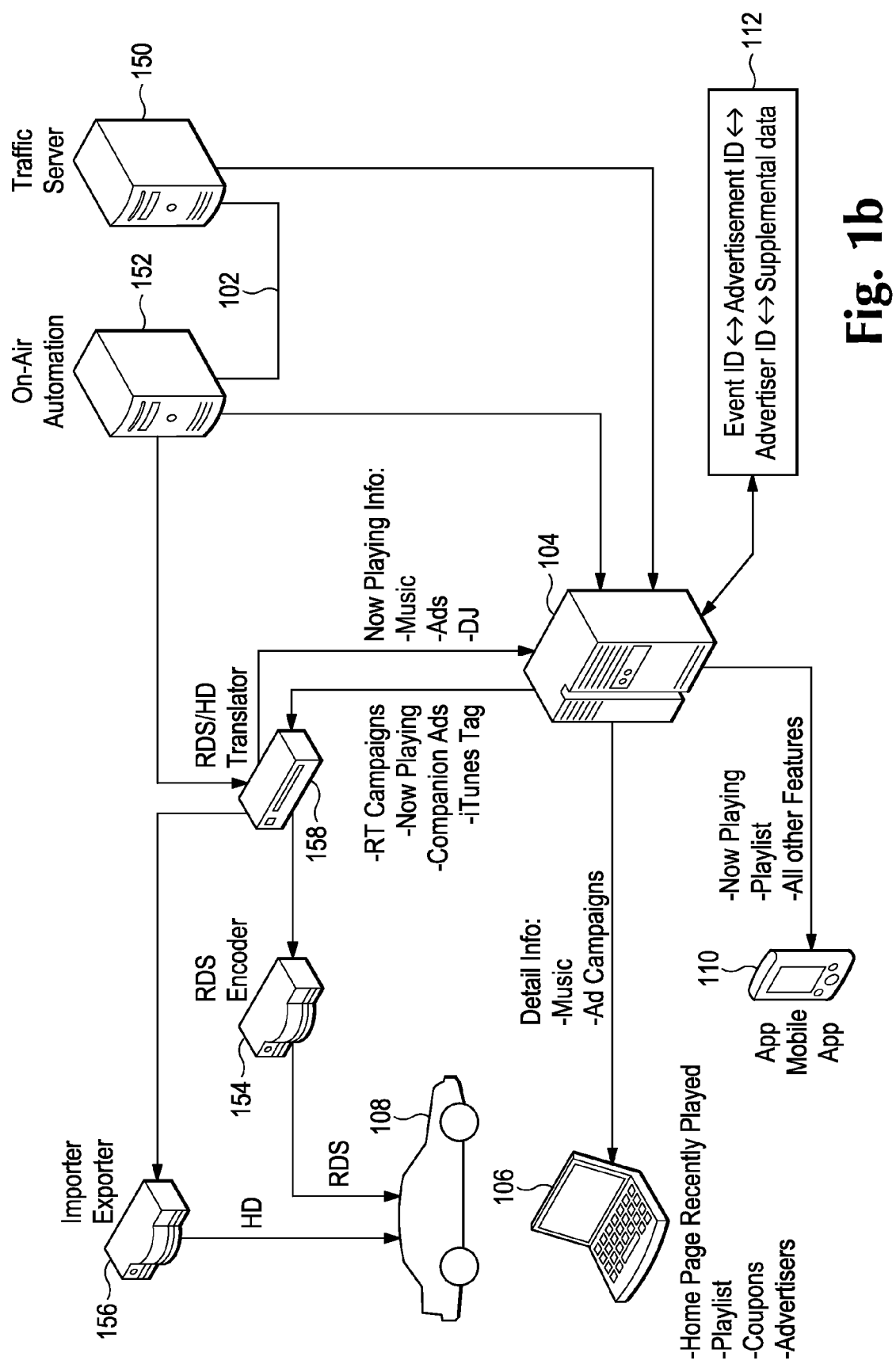
FIG. 1b depicts a system for interactive radio advertising.

In an example, Interactive Radio Server 104 enables listeners to interact with broadcast radio at multiple levels rendering it a clickable interactive and measurable media enabling sales of advertised consumer goods or services at the click of a button. interactive radio server 104 may be configured to provide one or more of the following: interactive advertising, interactive programming, radio on-demand, interactive music, and/or mobile marketing. interactive radio server 104 may provide an avenue to listeners to connect and engage with radio programming and advertising. For example, listeners may hear an advertisement for a product on the radio, see the brand name and slogan of the product on a car stereo display, see a coupon code number associated with the product on the car stereo display, access a coupon for a discount on the product via a website associated with the radio station, access the website associated with the radio station where a video of the advertisement may be accessed from a station playlist posted on the website or may be streaming in real-time while the advertisement airs and/or may select the advertisement from the radio station playlist to access a coupon or static advertisement (e.g., background skin or panel advertisement). Thus, interactive radio server 104 may coordinate an interactive and multi-platform advertising campaign.

In an example, broadcast radio listeners may react to radio content via rating and voting as well as requesting alerts for specific content. interactive radio server 104 may monitor voting and requests giving broadcasters data to enhance programming to improve advertiser targeting. interactive radio server 104 may monitor linking to advertiser coupons, advertisements, media items in a playlist and/or other content via a radio station website served by interactive radio server 104. interactive radio server 104 may compile statistics based on the monitoring. Radio content and advertising may also be shared through social networks via links to the advertiser coupons and/or other content via a radio station website served by interactive radio server 104 and/or radio station server 102.

In an example, user activity associated with the several different applications described below may be logged. interactive radio server 104 may produce reports associating media items and various recorded user behaviors such as clicking on songs, clicking on ads, sms messaging responsive to supplemental data 128 display on user devices. The report may correlate monitored user behavior with respect to time of day, from which communication device was supplemental data 129 or 128 accessed, what songs played before or after, what playlist ordering achieved the best results, and etc.

Several examples of the present application will now be described with reference to the accompanying drawings. Various other examples of the disclosed technology are also possible and practical. This application may be exemplified in many different forms and should not be construed as being limited to the examples set forth herein. The figures listed above illustrate various examples of the application and the operation of such examples. In the figures, the size of the boxes is not intended to represent the size of the various physical components. Only those parts of the various units are shown and described which are necessary to convey an understanding of the examples to those skilled in the art.

Additional aspects and advantages will be apparent from the following detailed description of example embodiments. The illustrated example embodiments and features are offered by way of example and not limitation. Furthermore, the described features, structures, or characteristics may be combined in any suitable manner in one or more example embodiments.

In general, the methodologies of the present disclosed technology may be carried out using one or more digital processors, for example the types of microprocessors that are commonly found in mobile telephones, PC's, servers, laptops, Personal Data Assistants (PDAs) and all manner of desktop or portable electronic appliances.

In the following description, certain specific details of programming, software modules, user selections, network transactions, database queries, database structures, etc., are provided for a thorough understanding of the example embodiments of the disclosed technology. However, those skilled in the art will recognize that the disclosed technology can be practiced without one or more of the specific details, or with other methods, components, materials, etc.

Example Embodiments

System

FIG. 1a depicts an example of a system 100 for providing coordinated and interactive radio advertising services to subscriber radio stations and/or advertisers on one or more of a variety of media platforms. In an example, interactive radio server 104 may comprise a service platform and advertising ecosystem to enable radio with on-demand features and interactive capabilities. Radio station 134 may be a subscriber radio station subscribed to interactive radio advertising services provided by interactive radio server 104.

In an example, radio station server 102 may be associated with a radio station 134. Radio station server 102 may identify broadcast programming in real-time in one or more messages 124. Radio station server 102 may send messages 124 to interactive radio station server 102 to identify media items playing in real-time. Interactive radio server 104 may compile a playlist 116 based on messages 124. In another example, radio station server 102 and may send playlist 116 to interactive radio server 104 in advance of broadcasting one or more media items 132.

In one example, each of several media items broadcast by radio station server 102 may each be identified in separate messages 124. The one or more message 124 may comprise an event ID or other data identifying media items 132 as they are broadcast. Media item 132 may comprise entertainment programming, advertising, news, traffic and/or any category of radio programming that may be broadcast.

Playlist 116 may comprise a listing of one or more media items 132 broadcast by the radio station over AM radio, FM radio, RDS, and/or HD Radio. AM radio broadcasting is the process of radio broadcasting using amplitude modulation. FM broadcasting is a broadcasting technology using frequency modulation (FM) to provide high-fidelity sound over broadcast radio. Radio Data System (RDS) is a communications protocol standard for embedding small amounts of digital information (e.g., time, station identification and program information) in conventional FM radio broadcasts. Radio Broadcast Data System (RBDS) is the official name used for the U.S. version of RDS. The two standards are slightly different. HD Radio, (originally "Hybrid Digital Radio"), is the trademark name for iBiquity's in-band on-channel (IBOC) digital radio technology used by AM and FM radio stations to transmit audio and data via a digital signal in conjunction with their analog signals. HD is a digital audio broadcasting method used in the United States. HD Radio allows for an all-digital mode, this system currently is used by some AM and FM radio stations to simulcast both digital and analog audio within the same channel (a hybridized digital-analog signal) as well as to add new FM channels and text information.

In an example, interactive radio server 104 may store playlist 116 in database 112. Playlist 116 data may be stored for any reasonable time period, for example seven days. Playlist 116 may include all or a sub-set of media items 132 broadcast by radio station server 102 during a specified time period. Radio station server 102 may identify which media items 132 are to be identified in playlist 116. For example, some advertisers may not be identified based on an advertising package purchased from radio station 134.

In an example, interactive radio server 104 may store playlist 116 in database 112 and may associate supplemental data 128 and/or supplemental data 129 with corresponding media items identified and/or included in playlist 116. For example, interactive radio server 104 may identify supplemental data 128 and/or supplemental data 129 corresponding to a song identified in playlist 116 and may associate the supplemental data 128 and/or supplemental data 129 with the song in database 112. Database 112 may comprise a single database or a plurality of databases and may be stored in interactive radio server 104 and/or in a different device and claimed subject matter is not limited in this regards.

In an example, the supplemental data 128 may comprise a variety of data types or categories, including: audio data, video data, image data, text data, metadata, song title, lyrics, album, album art, biographical information related to the artist performing the song, advertising data, coupons, coupon code, upcoming local concert dates for the artist, recent news related to the artist and/or a music video related to the song and claimed subject matter is not limited in this regard. In one example, supplemental data 128 may comprise RDS data, RDBS data, and/or HD data. Alternatively, supplemental data 128 may comprise data that is configured to be converted to RDS data, RDBS data, and/or HD data. Supplemental data 129 may comprise: audio data, video data, image data, text data, a song title, lyrics, an album title, album art, metadata, biographical information related to the artist performing the song, advertising data (e.g., image, audio, video, text, etc.), a coupon, coupon code, upcoming local concert dates for the artist, recent news related to the artist and/or a music video and claimed subject matter is not limited in this regard. In one example, supplemental data 129 may comprise data formatted for transmission via the Internet and/or for transmission in a mobile Internet format. Supplemental data 128 and/or 129 may be broadcast via RDS, RBDS and/or HD (in-band on-channel) and/or any of a variety of other broadcasting technologies known to those of skill in the art and claimed subject matter is not limited in this regard.

Interactive radio server 104 may obtain the supplemental data 128 and/or supplemental data 129 from any source, for example, from radio station 134, any of radio stations 114, a third party vendor, any available source via the Internet and/or a database 112.

In an example, one or more media items identified in playlist 116 may be identified with a unique identifier (UID). In another example, interactive radio server 104 may look-up one or more media item UIDs in a table or other data structure based on information in message 124 and/or playlist 116. Playlist 116 may identify one or more media items broadcast over any reasonable time period, such as for example one hour, one day, one week and/or one month.

In an example, radio station server 102 may comprise a station automation system 122 configured to monitor radio station server 102 broadcasting to determine which media item is playing in real-time. Station automation system 122 may send message 124 to interactive radio server 104, identifying the particular media item playing in real-time. In another example, message 124 may identify other real-time broadcast events such as when radio station server 102 is broadcasting DJ chat, a live sporting event, live music, a live interview, a traffic report, a news report, and/or station identification.

In an example, interactive radio server 104 may send supplemental data message 126 to radio station server 102. Supplemental data message 126 may identify and/or comprise supplemental data 128 and/or supplemental data 129 to be broadcast while one or more media items identified in message 124 are being broadcast. Interactive radio server 104 may send supplemental data message 126 to radio station server 102 responsive to receiving message 124 identifying the particular media item playing in real-time. Supplemental data 128 or 129 identified in supplemental data message 126 may be broadcast by radio station server 102 with the particular media item identified in message 124. Supplemental data 128 may be identified in supplemental data message 126 by a UID.

In an example, radio station server 102 may be in communication with transmitter 130. Transmitter 130 may broadcast one or more media items 312 and supplemental data 128 in radio broadcast portion 120. In an example, radio broadcast portion 120 may be transmitted using any of a variety of broadcasting technologies including, for example, AM Radio, FM Radio, RDS, RDBS, and/or HD Radio (in-band on-channel).

In an example, transmitter 130 may send (or transmit) supplemental data 128 in response to receiving supplemental data message 126. Supplemental data 128 and media item 132 may be transmitted together by transmitter 130 to a variety of radio receivers, such as, a radio 135, a car stereo 108 and/or another mobile device such as a radio receiver in a mobile telephone 110.

Substantially simultaneously with broadcasting supplemental data 128, interactive radio server 104 may make accessible the supplemental data 129 for one or more user devices, for example, a laptop computer 106 and/or a mobile telephone 110. Interactive radio server 104 may make accessible the supplemental data 129 responsive to receiving message 124, according to a schedule set-up by a user, and/or responsive to playlist 116. In another example, interactive radio server 104 may store media items 132 including advertising identified on playlist 116 and may transmit the one or more media items 132 out of order and/or on-demand responsive to a request from a user device, such as laptop 106 and/or mobile telephone 110. In an example, interactive radio server 104 may transmit the one or more media items 132 identified on playlist 116 via a variety of communication networks, such as; a telecommunication network, the Internet, a private network, or any combination thereof.

In an example, interactive radio server 104 may be coupled to database 112. Database 112 may store data identifying a plurality of subscriber radio stations 114. In an example, subscriber radio stations may access interactive radio services via interactive radio server 104. Radio station 134 may be included in the plurality of subscriber radio stations 114.

In one example, an advertiser 136 may be interested in advertising a product or service on radio utilizing interactive radio advertising. Advertiser 136 may subscribe to radio station 134 advertising services directly. Advertiser 136 may provide or identify media item 132, (such as, a radio advertising media) to radio station 134. Radio advertising media provided to radio station 134 may comprise audio, video, image, and/or text data in a variety of formats configured for display on a radio station website, sending via SMS, as well as for broadcasting over the air in AM, FM, RDS, RDBS and/or HD. Such radio advertising media may be included in playlist 116 and may be broadcast by radio station transmitter 130 according to an agreement between advertiser 136 and radio station 134. An identity of the media item 132 comprising the radio advertising media may be disclosed to interactive radio server 104 in message 124 and may be added to playlist 116 by interactive radio server 104.

As described above, interactive radio server 104 may look-up media item 132 in data structure 138 to determine if there is supplemental data 128 and/or supplemental data 129 associated with media item 132. If there is supplemental data 128 and/or 129 identified in data structure 138, interactive radio server 104 may retrieve the supplemental data 128 and/or supplemental data 129. Interactive radio server 104 may send supplemental data 128 to radio station server 102 to be broadcast (e.g., in RDS, RDBS and/or HD) while the media item 132 is being broadcast. If there is supplemental data 129 identified in data structure 138, interactive radio server 104 may post the supplemental data 129 in the appropriate platform (e.g., on a website associated with radio station 134 and/or sending out alerts, text messages, coupons, and the like).

In another example, advertiser 137 may subscribe to interactive radio advertising services provided by interactive radio server 104 directly. Advertiser 137 may provide or identify media item 132 comprising radio advertising media. Media item 132 may comprise audio, video, image, and/or text data in a variety of formats configured for display on a website associated with radio station 134, communicating via a telecommunications network, sending via short message service (SMS) and/or for broadcasting over the air in AM, FM, RDS, RDBS and/or HD.

In one example, interactive radio server 104 may store media item 132 identifier or the media item itself in data structure 138 and associate supplemental data 128 and/or supplemental data 129 with media item 132. If media item 132 is identified in message 124 and/or playlist 116, interactive radio server 104 may send supplemental data 128 to radio station server 102 to be broadcast while media item 132 is being broadcast over the air by transmitter 130. Interactive radio server 104 may display, link and/or play out media item 132 on a website associated with radio station 134. Interactive radio server 104 may display, link and/or play out supplemental data 129 associated with media item 132 on a website associated with radio station 134. In one example, laptop 106 and/or mobile telephone 110 may access media item 132 and/or supplemental data 129 via interactive radio server 104. Interactive radio server 104 may push media item 132 and/or supplemental data 128 to one or more of radio stations 114. One or more radio stations 114 may broadcast media item 132 and/or supplemental data 128.

In one example, supplemental data 128 may not be associated with media item 132. Advertiser 137 may directly subscribe to interactive radio services provided by interactive radio server 104. Interactive radio server 104 may provide supplemental data 128 to radio station server 102 to broadcast that is not related to the content of a media item currently being broadcast over-the-air. For example, responsive to a request by advertiser 137, interactive radio server 104 may send radio station server 102 supplemental data 128 related to an advertisement for food to be broadcast while a particular song is being broadcast by transmitter 130. When the song is being broadcast by radio station server 102, supplemental data 128 comprising text to display the name of the song and the performer may be displayed on a radio 135 display for a set time period (e.g., 60 seconds) then play a different supplemental data 128 comprising the advertisement for food requested by advertiser 137 may be displayed on a radio 135 display for a set time period (e.g., 30 seconds). The supplemental data 128 may be broadcast by individual radio station 134, or pushed by interactive radio server 104 to one or more of radio stations 114.

In an example, the timing may be coordinated by station automation system 122. However, radio station advertiser 136 or advertisers 137 may log into interactive radio server 104 and access special software (coined "Advertiser Experience") to schedule supplemental data 128 and/or media item 132 to be broadcast and/or displayed at certain times of day. For example, if advertiser 136 or 137 selects advertising for a Burger Joint, advertiser 136 or 137 may schedule supplemental data 128 text and/or graphics to be broadcast, for example "Get an Egg Sandwich" displaying a picture of a breakfast sandwich between 6 am and 12 pm, then switch to a "Get a Big Burger and a Salad" later in the day and display a graphic showing the burger and salad. Advertiser 136 and/or 137 may select different messages at different times and days of the week or in conjunction with other media items being broadcast by radio 134.

FIG. 1b is a block diagram illustrating a system for providing coordinated and interactive radio advertising services to one or more subscriber radio stations and/or advertisers on one or more of a variety of media platforms.

In an example, a radio station server 102 may comprise two servers, an automation system server 152 and a traffic system server 150. Automation system server 152 may send information to interactive radio server 104 about what is currently being broadcast by the radio station. The current broadcast information may be communicated in message 124 (see FIG. 1). Message 124 may comprise various data types, for example, identification numbers to identify artists and song titles, generic information about an advertisement, identify a DJ talking, and/or identify other programming. In an example, each time a broadcasting event occurs (e.g., playing a song, advertisement and/or when a DJ talks), a new "EVENT" is generated by the automation system server 152. Details regarding the EVENT may be sent in message 124 (e.g., artist and title for a song, generic name for an advertisement etc.) to interactive radio server 104. Each event may be associated with an event ID in interactive radio server 104.

In an example, traffic system server 150 may control trafficking (i.e., timing, scheduling, editing, ordering and/or billing) of advertisements for radio station 134. Radio sales personnel may enter sales orders in the traffic system server 150 and may include information such as the advertiser name (e.g., McDonald's®) the advertisement title, billing details, and/or the approximate times they wish for the advertisement to play. As happens, sales personnel may schedule an advertisement to play at 12:10 pm EST, but in fact the advertisement will probably play at 12:20 pm EST. Each advertisement may be associated with an advertisement ID. The advertisement ID may be the same ID used by the automation system server 152 as the event ID which may be a unique identifier. The unique identifier (event ID) may change on a daily basis.

In an example, sales personnel may enter the information in the traffic system server 150 and request an air time. A program director may review the advertisements for the day and may change the schedule to optimize programming. For example, ads may be scheduled to play certain advertisements after particular songs or other ads, or also to avoid playing two competitor's advertisements in consecutive order and/or for additional reasons. When the programming list is refined, it may be transmitted to an automation technician who may schedule the advertisements to play as per the program director instructions. The advertisements may be entered in a database associated with automation system server 152. A different description of the advertisement may be entered into the automation system server 152.

In an example, interactive radio server 104 may receive trafficking data from traffic server 150 comprising a daily listing of advertisers and advertisements to be played for the day, the listing may include advertisement IDs and/or advertiser IDs and/or timing information. In another example, the trafficking data may be a bare listing of advertisement and advertiser IDs with no timing information. interactive radio server 104 may store the trafficking data in database 112 (see FIG. 1a). As advertisements are broadcast by radio station server 102, interactive radio server 104 may receive automation data from automation system server 152, for example in message 124. interactive radio server 104 may compare the trafficking data to the automation data as it comes in real time. An advertisement ID may be the same ID used by the automation system server 152 as the event ID. Thus, based on an advertisement ID received in the trafficking data, interactive radio server 104 may associate an advertisement playing over the air identified with a particular event ID with the advertiser identified in the trafficking data. interactive radio server may access database 112 where an advertiser may be associated with supplemental data 128 (FIG. 1a) that is configured or may be configured to be played and/or displayed in a variety of formats including, for example, RDS, HD, RDBS, SMS, and/or data and graphic formats for display on an Internet website or mobile device. In an example, supplemental data 128 to be transmitted to a car stereo may be formatted to RDS and/or HD by RDS/HD translator 158 and RDS encoder 154 or importer/exporter 156.

In an example, interactive radio server 104 may permit users to create items, containing supplemental data 128 or 129 to be displayed on a radio's assets (e.g., car stereo, Internet website, and mobile website). An item created by the user may be associated to an advertiser identified in the trafficking data. Therefore when an advertisement plays over the air, interactive radio server 104 may receive an event ID that can be associated to the advertiser as described above and the interactive radio server 104 may look up in database 112 what supplemental data 128 needs to be displayed on the car stereo, on the Internet and/or on the mobile platform and may send the supplemental data 128 to the pertinent outlet (e.g., laptop 106, mobile phone 110 and/or radio station server 102 (for RDS/HD)). Supplemental data 128 may be time/day/date/station specific. For example when a McDonald's® advertisement plays in the morning, and Egg McMuffin may be displayed, changing it at noon to a Big Mac.

Radio station server may transmit for display the name of the advertiser may not necessarily be the name identified by the automation system server 152 along with a supplemental data 128 such as a call to action or a coupon combining the audio with the visual increasing advertising branding and efficiency. Users may access additional information about the supplemental data 128 displayed by sending a text message to an identified number in the call to action including keywords associated with the supplemental data 128. When users interact they receive additional details on their cell phone including mobile coupons.

Radio station server 102 may send specialized messages to used devices corresponding to the supplemental data 128 to display specialized messages when the DJ is talking and/or when music or other programming is playing.

Messages may be sponsored by advertisers (e.g., "Geico® Save 50% today") and may be filtered many different ways:
 a. Date
 b. Day of the week
 c. Time specific (multiple times a day)
 d. Duration
 e. Day part HD radio messages may also display the advertiser's logo when the advertisement airs or when the sponsorship is displayed. During radio programming such as when music is playing advertising messages may alternate with programming information (e.g. music title/artist name).

In an example, a media item 132 may be associated with a coupon, either in a daily deal format or in a standalone coupon format that may be accessible in a variety of forms, for example: in bar code form, in an email, over the internet, in a code provided in a text message, in a link to a printable copy of the coupon, in a mobile application and/or directly within the radio station website. Coupons may be offered in a separate website 900 (see FIG. 9a) or integrated in Interactive Panel 300. Mobile users may register and receive daily deals using the station coupons mobile app. User may also, register and receive daily deals via text messaging. In an example, radio DJs may promote the daily deals and drive users to register using any of the three methods above (see FIG. 9b).

FIG. 2 depicts an example of an integrated and interactive radio advertising campaign coordinated by interactive radio server 104 for Hutchinson Plumbing. Display screens for each of mobile telephone 110, laptop 106 and car stereo 108 are shown displaying advertising for Hutchinson Plumbing. Display of such advertising may be coordinated by interactive radio server 104 and may be shown at substantially the same time of day, responsive to receiving messages 124 and/or in association with a playlist 116. Timing for transmission of supplemental data 128 may be associated with receipt of message 124. In an example, interactive radio server 104 may also associate display of advertising data related to Hutchinson Plumbing in a website associated the radio station 134 with broadcasting of an audio advertisement by radio station server 102.

In an example, Hutchinson Plumbing may be an advertiser 137 and/or advertiser 136 as described with respect to FIG. 1. Display screen 208 on car stereo 108 may display supplemental data 128 comprising text data for advertising "Hutchinson Plumbing" including the slogan, "For all Your Plumbing" via RDS, RDBS and/or HD data. The text data may be displayed while radio station server 102 is broadcasting an audio advertisement for Hutchinson Plumbing. The supplemental data 128 may be communicated to radio station server 102 from interactive radio server 104 and may identify an association with the Hutchinson audio advertisement (a media items 132) identified as currently being broadcast in message 124. Radio station server 102 may broadcast media item 132 and supplemental data 128 together.

In an example, laptop 106 may access interactive radio server 104 to display website 212. Website 212 may be associated with radio station 134 and may be configured to display a variety of media items related to radio station 134 broadcast activities. For example, website 212 may display a playlist and advertising. Website 212 may display supplemental data 129 comprising one or more advertisements for Hutchinson Plumbing when radio station server 102 is broadcasting supplemental data 128. Website 212 may comprise Interactive Playlist Panel 300 discussed in great detail with respect to FIG. 3. Display screen 210 on mobile telephone 110 displays a user interface for mobile Internet comprising supplemental data 129 as well.

Mobile Device Tagging

In an example, a user may tag radio advertisements using SMS text messaging. In an example, when a user hears an advertisement the user may send a text message to a radio station using a specific keyword to receive information back in a text message. The information may include a link to a webpage generated automatically based on the selection and may be hosted by interactive radio server 104. The webpage may be specific to the advertisement containing the interactive information and/or a mobile coupon.

Email Marketing

In an example, a user may access email marketing features including an easy and powerful interface allowing radio stations to create and distribute marketing material to user databases via interactive radio server 104.

Ad Play Validation

In an example, an advertiser may login to interactive radio server 104 to check advertisement playtimes on select stations giving them a third party validation to the true times their advertisements aired. This information may be compiled based on playlist 116. This feature addresses a major issue in radio where the scheduled advertisements provided to advertisers and the real time the advertisements aired are not the same. Currently advertisers subscribe with providers such as Media Guide to provide them with this data.

Third Party Applications

Interactive radio server 104 may communicate advertising data with third party applications or phone applications or SMS providers so that radio stations using those applications may take full advantage of coupons capabilities without changing their providers.

Interactive Playlist Panel (IPP)

Figure 3:
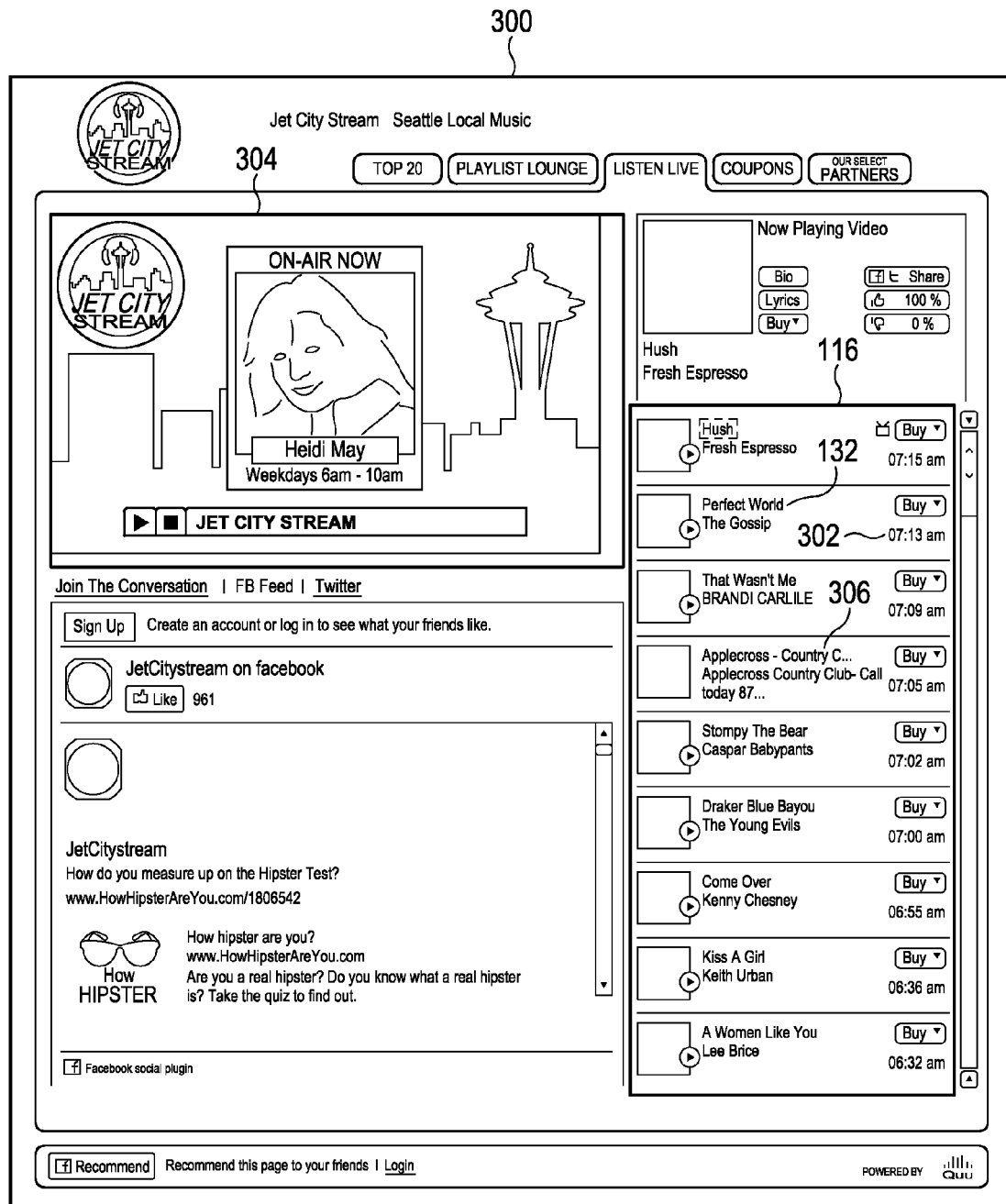
FIG. 3 illustrates an example of a user interface comprising an interactive panel.

FIG. 3 illustrates an example of a user interface comprising an interactive panel 300. Interactive panel 300 displays playlist 116. Playlist 116 may be compiled by interactive radio server 104 based on one or more messages 124 identifying media item 132 as it is being broadcast by transmitter 130 substantially in real-time. Playlist 116 may include a listing of radio station 134 programming including advertising, music, DJ talk, interviews and/or other programming for any reasonable period of time, for example, seven days. interactive radio server 104 may display a version of playlist 116 in interactive panel 300. Playlist 116 as displayed in panel 300 may be configured to include at least one of the following: media item 132 identifier (e.g., a name of song, an advertiser name, a name of on-air personality corresponding to programming included in playlist 116, or combinations thereof), a time stamp 302 indicating when media item 132 was broadcast by radio station 134, a link 304 to a video that may be embedded and associated with media item 132 and a trigger to change a background skin. Such a trigger 306 may be associated with a link to access a particular media item.

In an example, panel 300 may be associated with a website provided by interactive radio server 104 and may be a central portal for one or more other websites integrated by interactive radio server 104 in panel 300. Panel 300 may be invoked from within a separate website hosted by radio station server 102 (or another server associated with radio station 134). In one example, a panel 300 website may be accessed through a Now Playing widget on a different website. Panel 300 may also include the following: detailed information on music, detailed information on advertisements, links: to coupons, featured products, events, daily deals, Watch Radio On-Demand, and/or search capability for music and advertisements.

Figure 4:
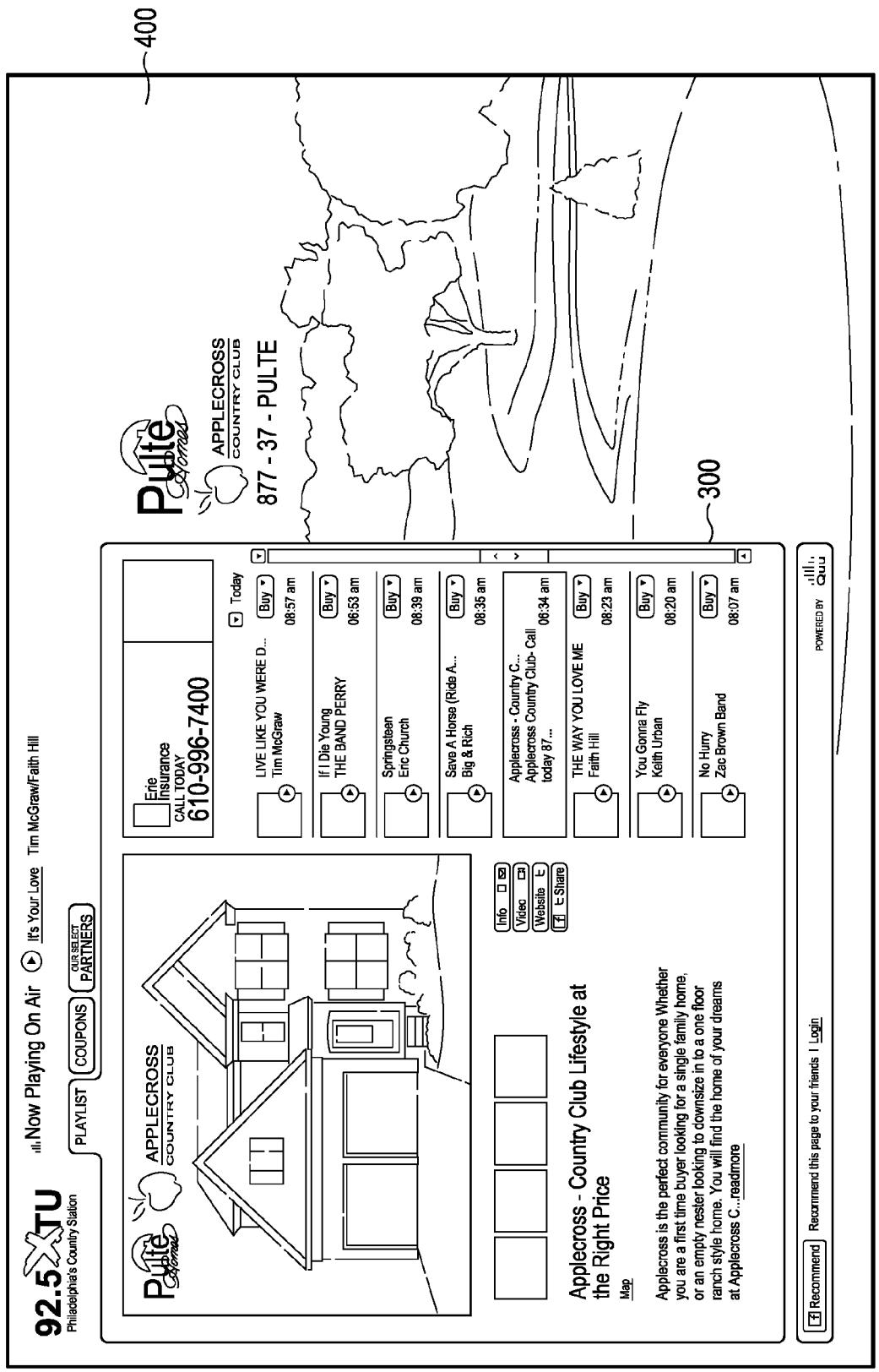
FIG. 4 is a flow diagram illustrating a method for interactive radio advertising.

In an example, an advertiser may sponsor the playlist 116 and/or background skin 400 (see FIG. 4).

When users click (select with a mouse) on a song they may be direct to another website to purchase the identified media item 132, download a ringtone associated with the media item 132, view artist biographical information and lyrics, add media item 132 to a preference list, and/or set mobile alerts when the media item 132 plays the radio or when an associated artist plays on the radio, or combinations thereof.

When users click on a media item 132 that is an advertisement they may request more information from the advertiser by filling a request form, listen to the audio from an associated Radio advertisement or infomercial, watch a video related to the media item 132 (e.g., television advertisement or infomercial), download mobile or printable coupons, receive daily deals, read the detailed description, link to the advertiser coupons website and map, and/or share information about the advertisement through a social network, or any combination thereof.

Pop-Ups

Figure 5:
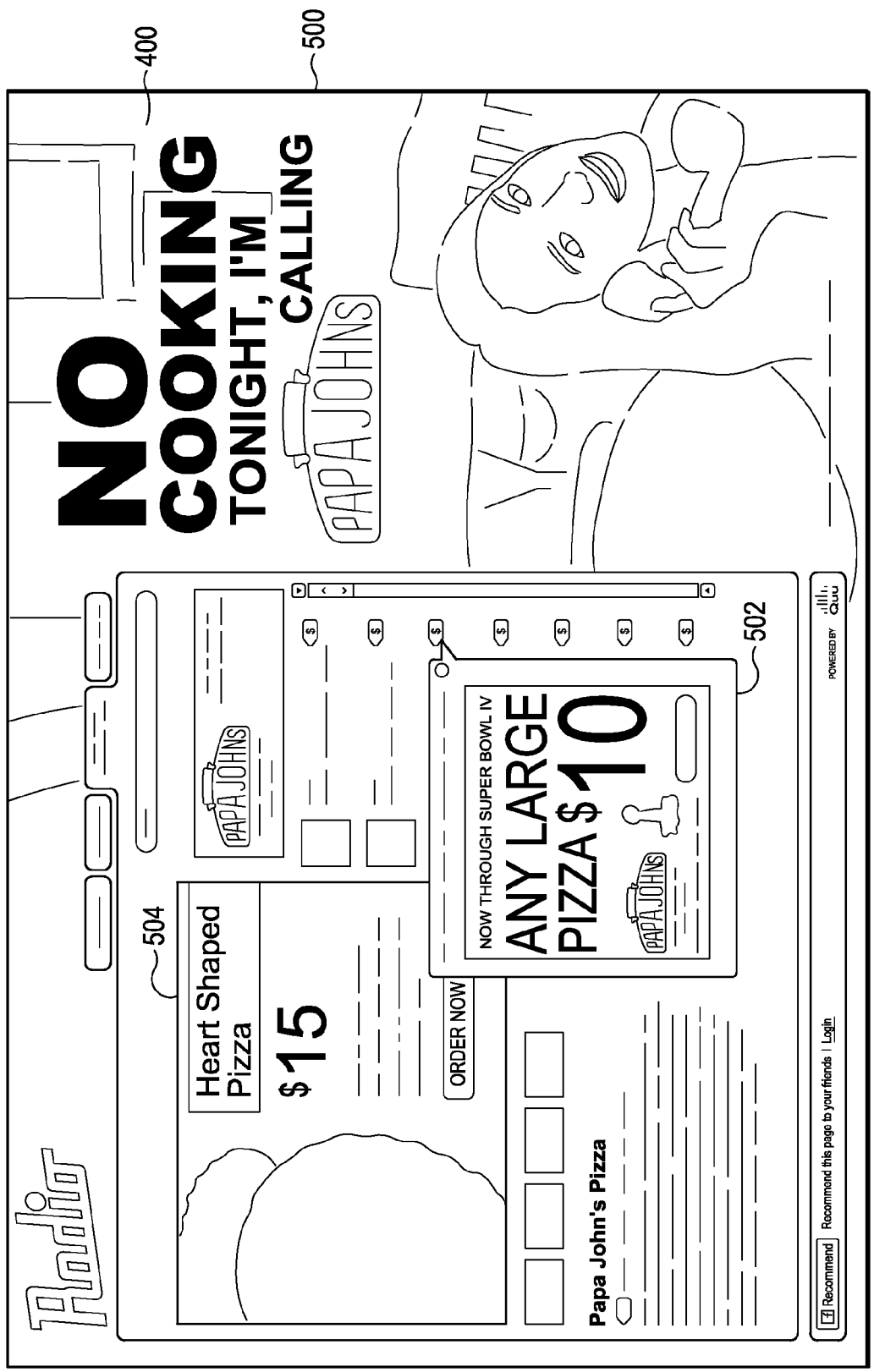
FIG. 5 illustrates an example of a user interface comprising an interactive panel

FIG. 5 illustrates an example of a user interface comprising an interactive panel 500. From the display of playlist 116 in interactive panel 500, a pop-up window 502 may be activated when a user selects a corresponding media item 132 in playlist 116. Selecting the media item may activate interactive radio server 104 to change a background skin and/or to embed a coupon 504 in interactive panel 500 associated with the media item 132.

Alerts

Figure 6:
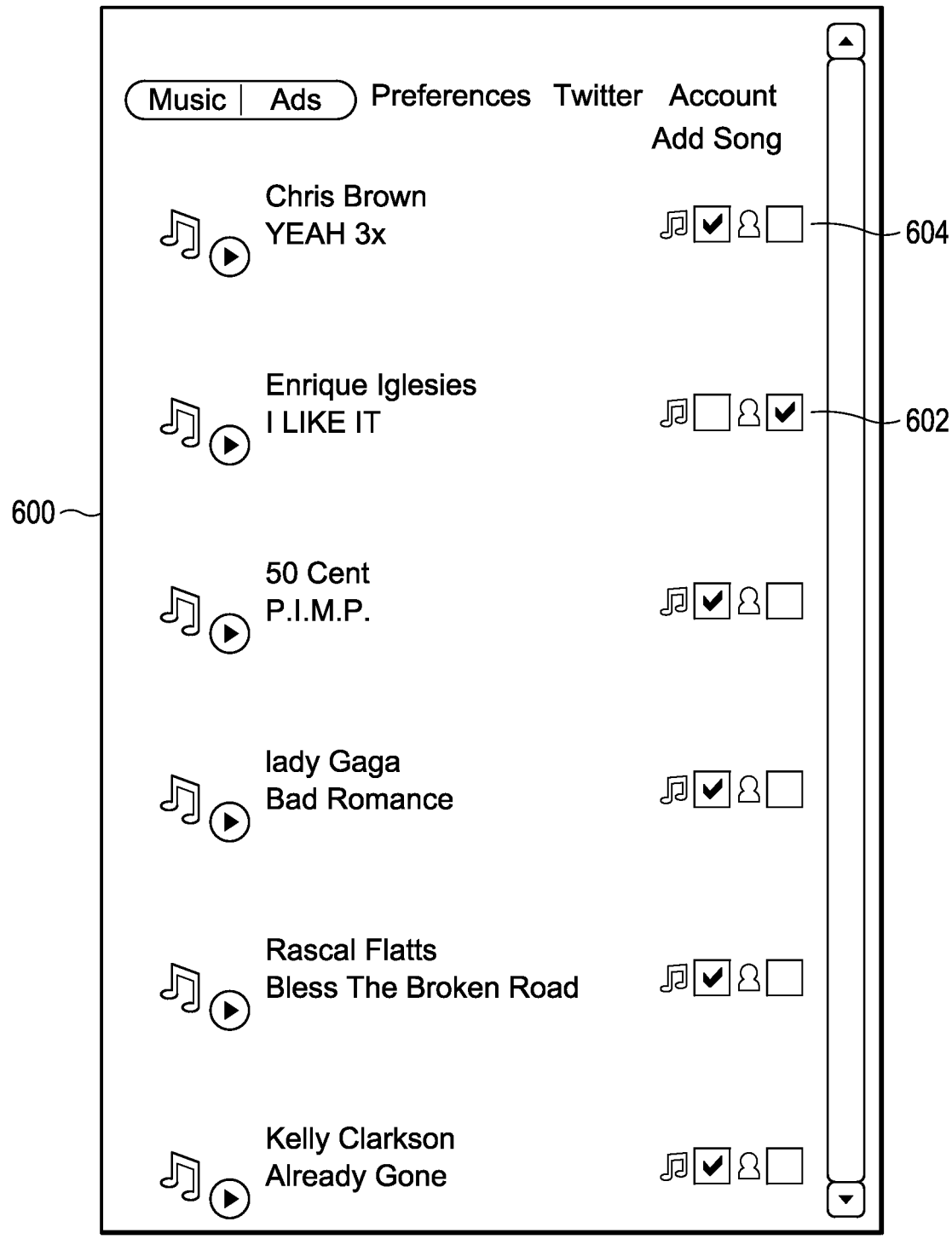
FIG. 6 depicts an interactive radio programming mobile interface for an alert application.

FIG. 6 depicts an interactive radio programming mobile interface 600 for an alert application that may run on interactive radio server 104 or any other appropriate device. A user may access the application via a variety of devices including: a mobile device such as a cell phone, a computer, a laptop, and/or a notepad. The alert application may be used to create mobile alerts to notify a user that a selected media item 132 in playing on the radio. Alerts may be sent to the user device based on message 124. Alerts may be created in from the radio station website hosted by radio station server 102 and/or users may register via an interactive radio server 104 hosted website. To register a user merely identifies a media item of interest and a device to which an alert is to be sent. The alert application may search for the identified media and send an alert to an identified device. Alerts may be based on an associated radio station 134 playlist 116. Users may indicate whether the alert should be based on a particular media item 602 or an artist 604 who may be associated with several media items in a playlist. In an example, their cell phones using text messaging listeners may register and search for music directly from their phones. From their cell phones accessing interactive radio server 104 or radio station server 102 listeners may create alerts using the alert application and receive alerts either via the application via the Internet, mobile Internet or a text message. A listener may set their preferences to how often to receive alerts as well as turn off the alerts during the night.

Mobile Device Tagging

Listeners may tag music or advertisements using simple text messaging. When a user hears an advertisement he/she may simply text a station keyword to a phone number identified in the broadcast. In response, listeners may receive a text message containing the more information about products, services, name of the song and/or the artist.

Business Interface

FIG. 7 depicts an example of an interactive radio programming user interface 700 for a backend customer service and upload (BCSU) application that may run on interactive radio server 104 or any other appropriate device. The BCSU application may facilitate communication between interactive radio server 104 and an advertiser 136 or 137 and/or a radio station 132. The BCSU application may be web based and designed for radio advertising sales departments. The BCSU application may allow radio station or advertising personnel to upload media rich information such as pictures video description etc. and attach the uploaded media to an advertisement identified in the playlist 116. In an example, a user may request that the advertisement be made interactive by selecting one or more campaign types, including, for example: on-air, online, background skin, supplemental data RBDS, supplemental data RDS, supplemental data HD, SMSI mobile coupon, and/or print coupon, any combinations thereof. Campaign types may include other categories and claimed subject matter is not limited in this regard.

Interactive Programming

FIG. 8 depicts an interactive radio programming user interface 800 for an interactive radio programming (interactive radioP) application that may run on interactive radio server 104 or any other appropriate device. The interactive radioP application may facilitate communication between users and radio station personnel such as Disc Jockeys (DJs), on-air talent and/or with each other. Users may send a response to votes solicited by radio station DJ during programming. Users may also opt-in via the radio station website to receive updates on different subjects such as emergencies or news. A DJ may control interaction from a single control panel and may respond to one or more users at the same time. The interaction may take place through multiple outlets.

In an example, short message system (SMS) users may send text messages to correspond with the DJ and may receive replies from the DJ through the user interface 800. Users may also receive text message alerts or reminders on subjects or shows they are interested in via other user devices such as laptop 106 and/or mobile phone 110.

In an example, through an interactive panel chat room users may interact with the DJ as well as each other. The DJ may receive the comments in the same panel where he/she views the sms messages combining online and offline users. Messages, comments, votes and/or other interactions with users may be displayed in user interface 800.

In another example, a user may send a text message to a radio station telephone to request the name of a song, to get alerts when their favorite music is playing, send comments to the station, vote and/or rate and receive updates on subjects of interest or mobile coupons. The radio station may respond with requested information as well as supplemental data 128 including coupons or other advertising vehicles.

Daily Deals and Coupons

Figure 9A:
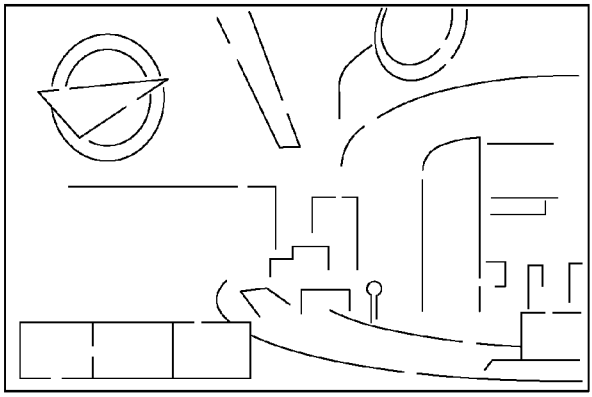
FIG. 9a depicts interactive radio programming interface for coupon distribution.
Figure 9B:
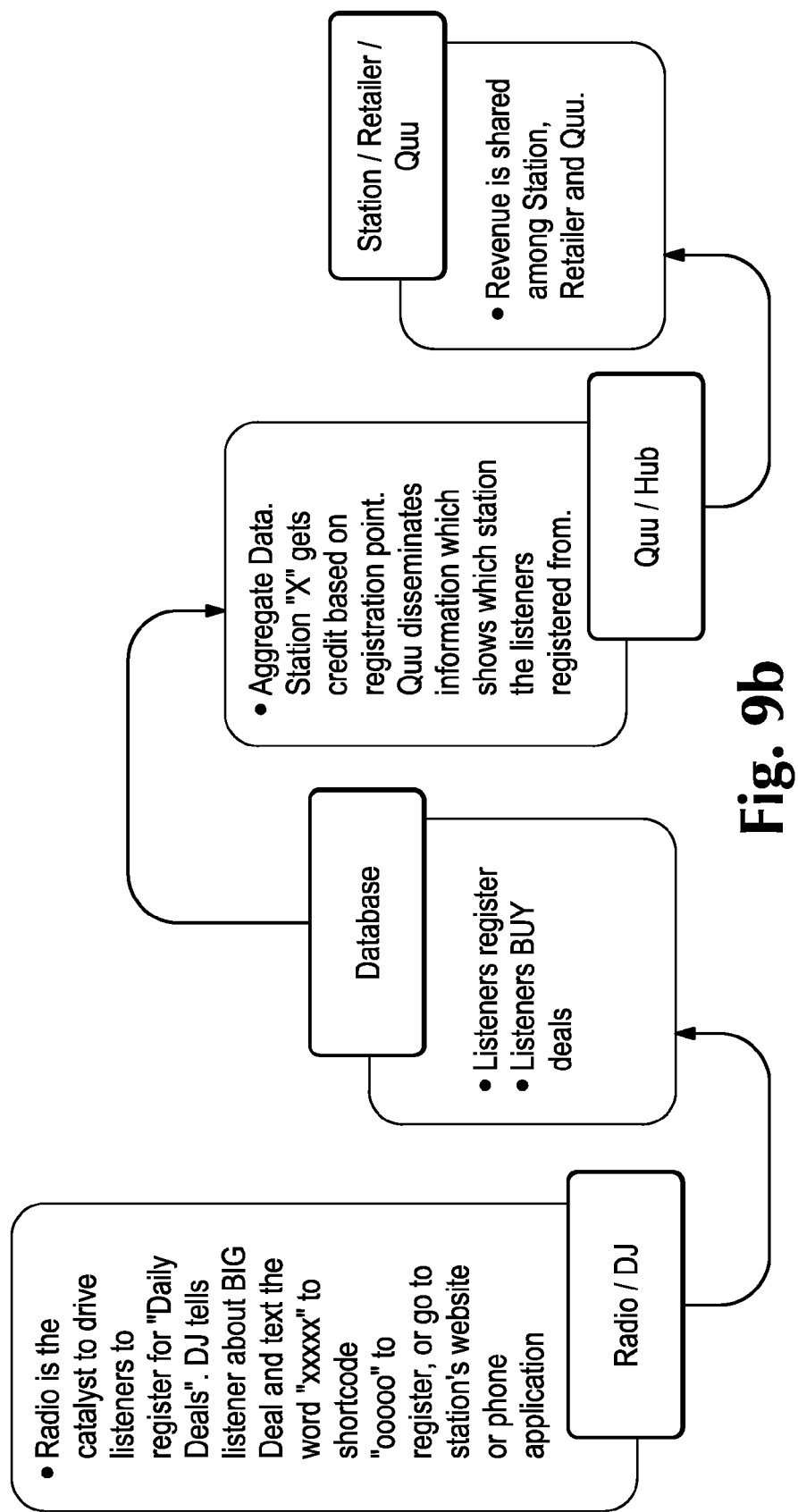
FIG. 9b depicts a flow diagram related to coupon distribution in an interactive radio programming system.

In an example, coupons associated with media items 132 may be available via a website hosted by radio station server 102 or via Interactive Panel 300. In an embodiment, users may register and receive daily deals via a radio station website or via interactive panel 300. In another example, coupons may be available from a separate daily deal website 900 as shown in FIG. 9a.

In another example, consumers may register and receive daily deals via text messaging. For example, radio DJs may promote the daily deals and drive listeners to register using any of the methods discussed above. Hence coupons engage listeners increase station website traffic and boost revenue (see FIG. 9b).

WatchRadio On-Demand (WROD)

Figure 10:
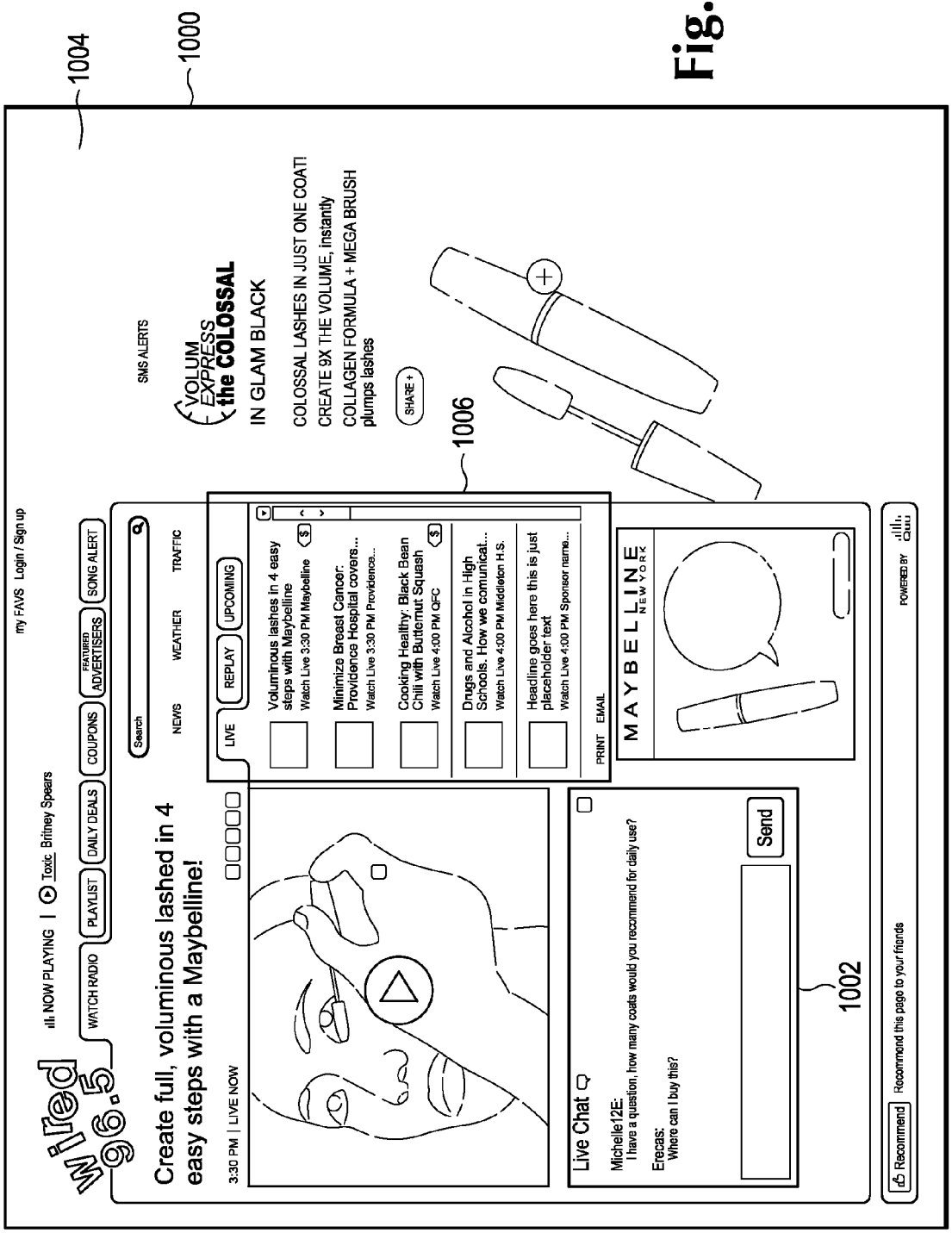
FIG. 10 depicts an interactive radio programming user interface.

FIG. 10 depicts a user interface 1000 for an application to facilitate video display during a corresponding radio broadcast (coined WatchRadio On-Demand). The video display application may be accessed by a user via interactive radio server 104 or another appropriate device. WROD displays a live or prerecorded stream of video content that may be streamed to a radio station website by interactive radio server 104 (or another device) while a radio broadcast associated with the streaming video content is being broadcast by radio station server 102. In an example, a user may chat with a presenter featured in the streaming video while the programming is being performed and broadcast live. Similarly, a user may chat with other users during the live broadcast. Live chat may be displayed in panel 1002. A background skin 1004 may be configured to advertise a product featured in the video.

In another example, user interface 1000 provide a link or an panel featuring a coupon for the product featured in the streaming video or may offer a different unrelated product. The type of videos available may be catered to the station demographic audience. In an example, radio station server 102 may broadcast live video from within the radio station 134 studio letting listeners watch the DJ and chat with him/her as well as amongst each other. When a radio advertisement plays the video of the advertisement if available and may automatically start playing. Videos may be archived and made available via user interface 1000, for example, in panel 1006. The product offers many features such as but not limited to: preshow video, advertising, pay-per-view, user registration, consumer feedback and etc. In an example, video may be provided by a third party vendor and presented in an iframe within a website associated with radio station 134 and may be server by interactive radio server 104.

Mobile Marketing interactive radio server 104 may coordinate a mobile marketing campaign making detailed information about a traditional advertisement (e.g., radio, TV, billboard etc.) available to consumers via a texting campaign. In an example, a keyword consumers may text to request more information may be associated with media items 132, supplemental data 128 and/or supplemental data 129. When consumers send the keyword in a text message to the identified number, the interactive content is sent to their cell phones along with coupons when available.

Now Playing (NP)

Figure 11:
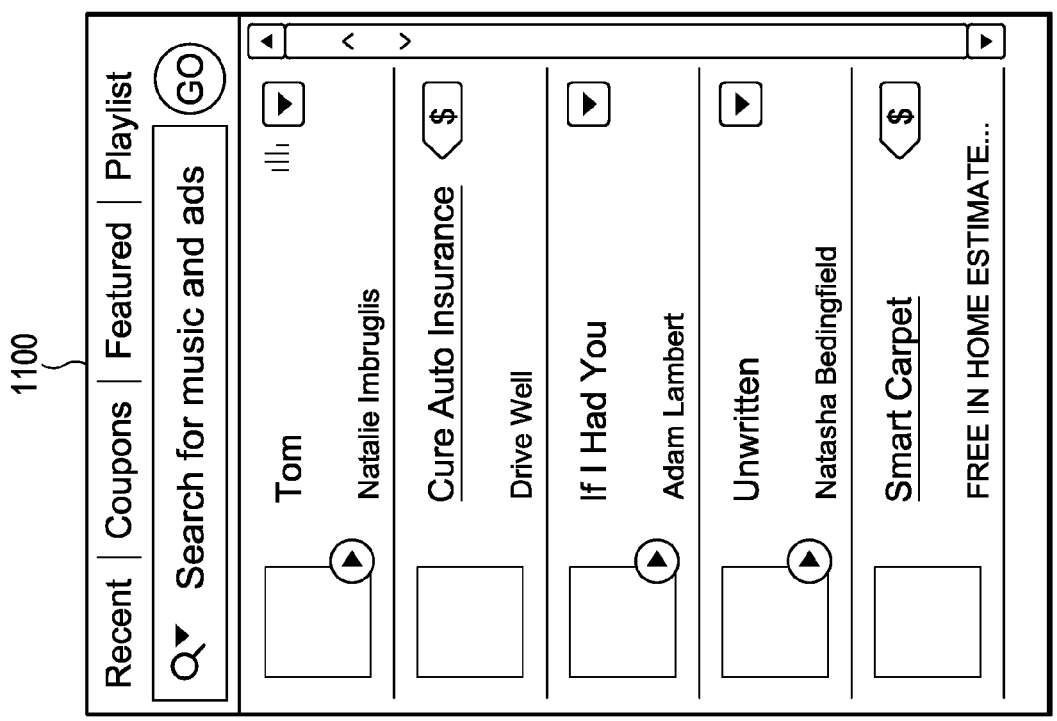
FIG. 11 depicts a Now Playing widget 1100 that may be web based and integrated in the home page of a radio station website hosted by radio station server 102.

FIG. 11 depicts a Now Playing widget 1100 that may be web based and integrated in the home page of a radio station website hosted by radio station server 102. The features of the NP include:

a. It features the most recent songs and advertisements played on the air. Both are clickable. One or both may be based on playlist 116 received from interactive radio server 104.
b. Quick links to coupons and featured products or events.
c. Quick Search for advertisements and music.
d. The widget may be sponsored by one or more advertisers.
e. Appearance and size are configurable to match radio branding.

In an example, a user may access Interactive Panel 300 from the radio station website. In one example, Interactive Panel 300 may be accessed when a user selects a feature of the Now Playing widget.

In an example, a user may insert advertising in the Now Playing widget in four different ways:

a. In the playlist in between songs both in NP and QIP.
b. As a background skin in the QIP.
c. As a large advertisement in the QIP prior to displaying any song details when the user opens the page.

When a user clicks on a song or an advertisement it opens an Interactive Panel 300 which displays the details pertaining to the song or advertisement they clicked on. Listeners may purchase songs from iTunes® or Amazon® to download the ringtone examine the lyrics and artist bio or add the song to their favorites list or alerts (described above).

If users share the song or the advertisement through Facebook®, Twitter® and other social networks, the shared link may open the Interactive Panel 300 of the originating radio station. Hence the station benefits in increased website traffic.

Figure 12:
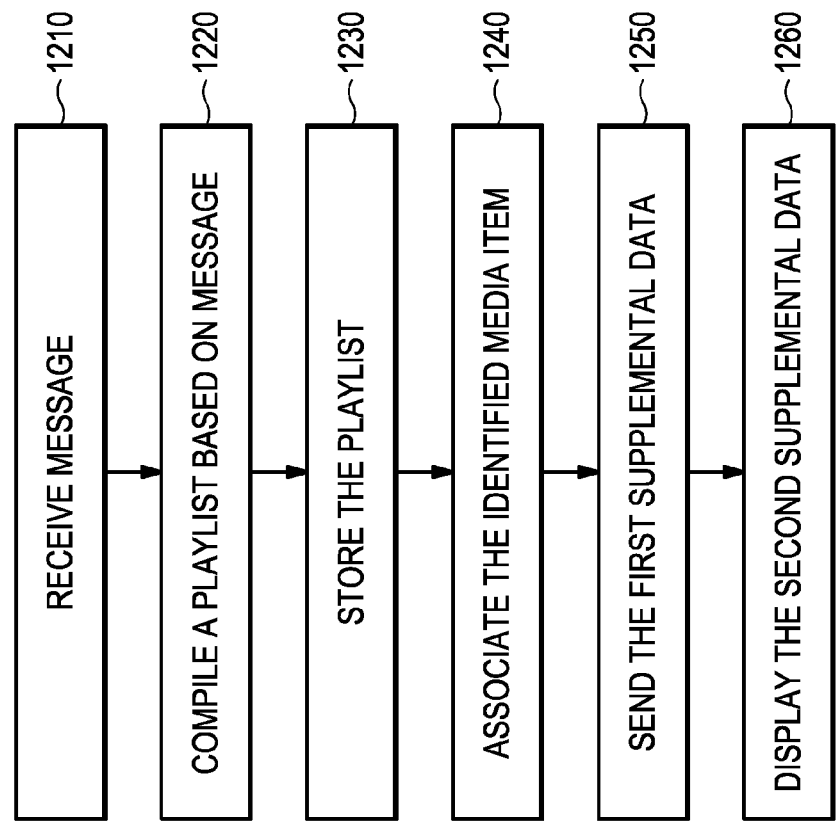
FIG. 12 depicts a process for providing interactive radio service.

FIG. 12 depicts a process 1200 for providing interactive radio service. In operation 1210 an interactive radio server receives a message identifying a media item comprising a song or an advertisement, or a combination thereof. In operation 1220, the interactive radio server compiles a playlist based on the message, wherein the playlist identifies a plurality of media items comprising at least one advertisement and at least one song. In operation 1230, the interactive radio server stores the playlist in a database. In operation 1240, the interactive radio server associates the identified media item with a first supplemental data and a second supplemental data. In operation 1250, the interactive radio server sends the first supplemental data to a radio station server to be broadcast substantially simultaneously with the associated media item. In operation 1260, the interactive radio server displays the second supplemental data on a website, wherein the website is configured to be accessed by a computer and a mobile device.

Many modifications and other embodiments of the disclosed technology will come to mind to those skilled in the art to which this disclosed technology pertains having the benefit of the teachings presented in the foregoing descriptions and the associated drawings. Therefore, it is to be understood that the disclosed technology is not to be limited to the specific embodiments disclosed and that modifications and other embodiments are intended to be included within the scope of the appended claims. Although specific terms are employed herein, there are used in a generic and descriptive sense only and not for purposes of limitation. It will be obvious to those having skill in the art that many changes may be made to the details of the above-described embodiments without departing from the underlying principles of the disclosed technology. The scope of the present disclosed technology should, therefore, be determined only by the following claims.

What is claimed is:

1. A method, comprising:
   receiving, by a processing device, a message identifying a media item comprising a song or an advertisement, or a combination thereof;
   compiling, by the processing device, a playlist based on the message, wherein the playlist identifies a plurality of media items comprising at least one advertisement and at least one song;
   storing, by the processing device, the playlist in a database;
   associating, by the processing device, the identified media item with a first supplemental data and a second supplemental data;
   sending, by the processing device, the first supplemental data to a radio station server to be broadcast substantially simultaneously with the associated media item; and
   sending, by the processing device, the second supplemental data to a website, wherein the website is configured to be accessed by a computer or a mobile device;
   storing, by the processing device, the second supplemental data; and
   displaying, by the processing device, the second supplement data responsive to a user input, wherein the user input causes the second supplemental data to be displayed out of order and on-demand.

2. The method of claim 1, wherein sending the first supplemental data to the radio station server further comprises, indicating, by the processing device, that the first supplemental data is associated with the media item.

3. The method of claim 1 wherein:
the media item is a product advertisement; and
the first supplemental data comprises at least one of a video media item, a mobile and printable coupon, a textual description, a link to the advertiser's website, and a link for sharing through a social network.

4. The method of claim 1 wherein:
the processing device is configured to execute stored instructions that implement an interactive radio server; and
the interactive radio server is arranged to post the supplemental data item to a website associated with a radio station server.

5. The method of claim 4 wherein the interactive radio server is arranged to interact with a user/listener through the website associated with the radio station server.

6. The method of claim 4 wherein the now playing message is sent from a radio broadcast server to the interactive radio server, and the message identifies at least one real-time broadcast event from a set of events that includes DJ chat, a live sporting event, live music, a live interview, a traffic report, a news report, and/or station identification.

7. The method of claim 4 wherein the interactive radio server is arranged to interact with a software widget operable on the website associated with the radio station server.

8. The method of claim 7 wherein the widget enables user input to cause the supplemental data to be displayed on-demand.

9. The method of claim 7 wherein the widget enables user input to cause the supplemental data to be displayed out of order.

10. A system comprising:
an individual radio station server, arranged to broadcast radio content via a transmitter;
an interactive radio server, arranged for communications with the radio station server;
a database accessible to the interactive radio server and arranged to store a plurality of first supplemental data items, each of the first supplemental data items associated with at least one media item comprising a song or an advertisement;
the individual radio station server arranged to send a message to the interactive radio server, the message identifying substantially in real time a specific radio content item now playing on the radio station server;
wherein the interactive radio server is configured to query the database responsive to receiving the message, and to download a first supplemental data item associated with the specific radio content item identified by the message;
and wherein the interactive radio server is further configured to send the downloaded first supplemental data item in a reply message to the radio station server, so as to enable the radio station server to broadcast the first supplemental data item substantially simultaneously with the specific radio content item now playing, wherein the first supplemental data item comprises textual content for delivery on a display screen of a user device currently receiving the said radio content now playing.

11. The system of claim 10 wherein the transmitter broadcasts the radio content via satellite, and also broadcasts the supplemental data item via satellite.

12. The system of claim 10 wherein the interactive radio server is arranged to post the supplemental data item to a website associated with the radio station server.

13. The system of claim 10 wherein the interactive radio server is arranged to interact with a user/listener through the website associated with the radio station server.

14. The system of claim 10 wherein the now playing message identifies at least one real-time broadcast event from a set of events that includes DJ chat, a live sporting event, live music, a live interview, a traffic report, a news report, and/or station identification.

15. The system of claim 10 wherein the interactive radio server is arranged to interact with a software widget operable on the website associated with the radio station server.

16. The system of claim 15 wherein the widget enables user input to cause the supplemental data to be displayed on-demand.

17. The system of claim 15 wherein the widget displays a playlist on the radio station web site, wherein the interactive radio server populates the playlist based on the messages received from the radio station server.

18. The system of claim 17 wherein the playlist covers multiple days of radio broadcasting and includes music items as well as advertisement items.

19. The system of claim 17 wherein the widget implements a search function for the playlist to search for music, ads or coupons recently featured on the radio station.

20. The system of claim 17 wherein the supplemental data includes a coupon, and the coupon is printable through the widget on the radio station server.

21. The system of claim 17 wherein the widget implements links to coupons, featured products or events, daily deals, or advertisers.

22. The system of claim 17 wherein the interactive radio server is also arranged to send the supplemental data item to a user's mobile device in the case that the downloaded supplemental data item is formatted for display on a mobile device.

23. The system of claim 17 wherein the supplemental data comprises at least one of an artist bio, video of an artist performing, and song lyrics.

24. The system of claim 17 wherein the widget implements sharing user-selected data through a social network; wherein the user-selected data is selected from the playlist, the supplemental data, or a combination thereof.

* * * * *